US011069786B2

(12) United States Patent
Goldman

(10) Patent No.: US 11,069,786 B2
(45) Date of Patent: *Jul. 20, 2021

(54) CONTROLLING EXECUTION OF SOFTWARE BY COMBINING SECURE BOOT AND TRUSTED BOOT FEATURES

(71) Applicant: International Business Machines Corporation, Armonk, NY (US)

(72) Inventor: Kenneth A. Goldman, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/532,842

(22) Filed: Aug. 6, 2019

(65) Prior Publication Data

US 2019/0363169 A1 Nov. 28, 2019

Related U.S. Application Data

(63) Continuation of application No. 15/169,890, filed on Jun. 1, 2016, now Pat. No. 10,541,816.

(51) Int. Cl.
*G06F 21/12* (2013.01)
*G06F 21/44* (2013.01)
(Continued)

(52) U.S. Cl.
CPC ........ *H01L 29/42376* (2013.01); *G06F 21/12* (2013.01); *G06F 21/44* (2013.01);
(Continued)

(58) Field of Classification Search
CPC .................. H04L 9/3247; H04L 9/4416; H04L 63/062; H04L 63/123; G06F 21/575
See application file for complete search history.

(56) References Cited

U.S. PATENT DOCUMENTS 7,529,919 B2   5/2009   Lampson et al.
7,711,942 B2   5/2010   Wang et al.
(Continued)

OTHER PUBLICATIONS

Berger et al., "Scalable Attestation: A Step Toward Secure and Trusted Clouds," 2015 IEEE International Conference on Cloud Engineering (IC2E), Mar. 2015, pp. 185-194.
(Continued)

*Primary Examiner* — Mohammed Waliullah
(74) *Attorney, Agent, or Firm* — Yee & Associates, P.C.

(57) ABSTRACT

Controlling execution of software is provided. In response to receiving an input to execute a software module on a data processing system, a set of measurements are performed on the software module performing a process to prepare the software module for execution on the data processing system. In response to determining that the set of measurements meets a predetermined criterion, an authorization to proceed with the process of preparing the software module for execution on the data processing system is requested from a trusted third party computer. In response to receiving the authorization to proceed with the process of preparing the software module for execution on the data processing system from the trusted third party computer, the software module is executed.

20 Claims, 6 Drawing Sheets

(51) Int. Cl.
*G06F 21/51* (2013.01)
*H01L 29/66* (2006.01)
*H01L 29/423* (2006.01)
*H01L 21/8234* (2006.01)
*H01L 21/265* (2006.01)
*H01L 27/12* (2006.01)
*H01L 21/8238* (2006.01)
*H01L 27/092* (2006.01)
*H01L 29/78* (2006.01)

(52) U.S. Cl.
CPC ............ *G06F 21/51* (2013.01); *H01L 21/265* (2013.01); *H01L 21/82385* (2013.01); *H01L 21/823468* (2013.01); *H01L 21/823821* (2013.01); *H01L 27/0924* (2013.01); *H01L 27/1211* (2013.01); *H01L 29/66545* (2013.01); *H01L 29/66795* (2013.01); *H01L 29/7843* (2013.01); *H01L 29/7848* (2013.01); *H01L 21/823842* (2013.01)

(56) References Cited

U.S. PATENT DOCUMENTS

| | | | |
|---|---|---|---|
| 8,028,172 B2 | 9/2011 | Hunter et al. | |
| 8,321,931 B2 | 11/2012 | Zimmer et al. | |
| 8,560,845 B2 | 10/2013 | Krstic et al. | |
| 8,751,782 B2* | 6/2014 | Khosravi | G06F 21/575 |
| | | | 713/189 |
| 8,782,387 B2 | 7/2014 | Berg et al. | |
| 8,843,650 B2 | 9/2014 | Song et al. | |
| 9,489,512 B2 | 11/2016 | Thom et al. | |
| 2007/0150937 A1* | 6/2007 | Gatto | G06F 21/51 |
| | | | 726/1 |
| 2008/0126873 A1* | 5/2008 | Cocker | G06F 11/3636 |
| | | | 714/38.11 |
| 2009/0265792 A1* | 10/2009 | Martinez | G06F 21/572 |
| | | | 726/29 |
| 2011/0107395 A1 | 5/2011 | Takala et al. | |
| 2012/0151199 A1* | 6/2012 | Shriver | G06F 21/575 |
| | | | 713/2 |
| 2013/0117006 A1 | 5/2013 | Varghese et al. | |
| 2014/0025939 A1 | 1/2014 | Smith et al. | |
| 2015/0019851 A1 | 1/2015 | Alandt et al. | |
| 2016/0050071 A1 | 2/2016 | Collart et al. | |
| 2016/0070914 A1 | 3/2016 | Baentsch et al. | |
| 2016/0259941 A1* | 9/2016 | Vasudevan | G06F 21/575 |
| 2017/0353313 A1 | 12/2017 | Goldman | |

OTHER PUBLICATIONS

Kai et al., "The Secure Boot of Embedded System Based on Mobile Trusted Module," IEEE, 2012 Second International Conference on Intelligent System Design and Engineering Application (ISDEA), Jan. 2012, pp. 1331-1334.

Office Action, dated Apr. 11, 2018, regarding U.S. Appl. No. 15/169,890, 20 pages.

Final Office Action, dated Nov. 16, 2018, regarding U.S. Appl. No. 15/169,890, 19 pages.

Notice of Allowance, dated May 28, 2019, regarding U.S. Appl. No. 15/169,890, 15 pages.

List of IBM Patents or Patent Applications Treated as Related, dated Aug. 6, 2019, 2 pages.

\* cited by examiner

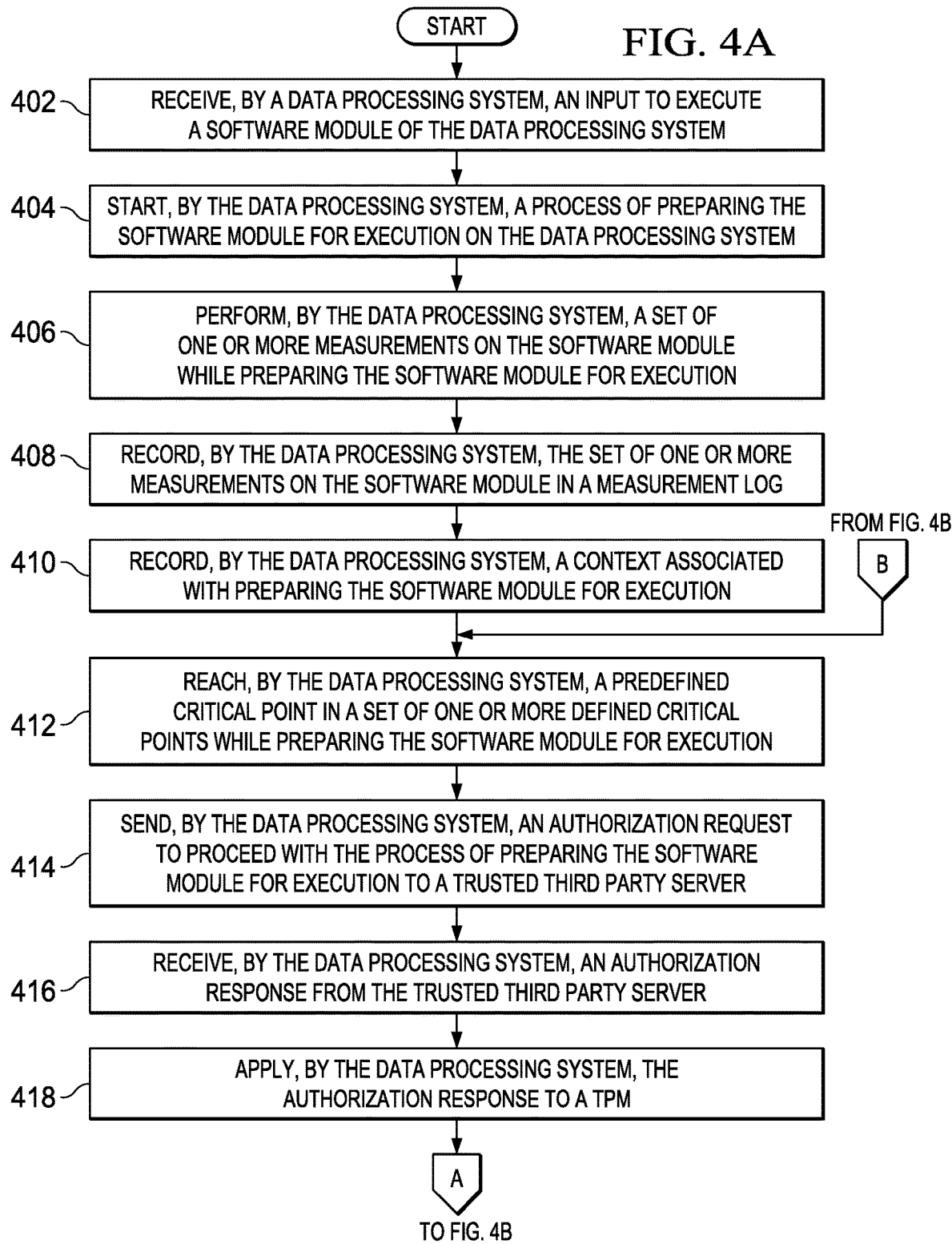

CONTROLLING EXECUTION OF SOFTWARE BY COMBINING SECURE BOOT AND TRUSTED BOOT FEATURES

BACKGROUND

1. Field

The disclosure relates generally to software execution and more specifically to controlling execution of a software module on a data processing system by combining features of a secure boot process and a trusted boot process.

2. Description of the Related Art

Security is a widespread concern for computer users. Computer security is a broad concept covering various types of unauthorized involvement with computing systems. Viruses, worms, Trojan horses, and software alterations are rampant. Unauthorized modifications to computer software may be performed for malicious purposes. Any software executed on a computer may be under attack. From a security perspective, any software on a computer may be considered at risk, as flaws in the software may allow malware to exploit the flaws to, for example, misappropriate passwords or other sensitive information. Of concern is the ability to monitor and verify the integrity of software resources, such as, operating systems and applications, on a computer.

SUMMARY

According to one illustrative embodiment, a computer-implemented method for controlling execution of software is provided. In response to a data processing system receiving an input to execute a software module on the data processing system, the data processing system performs a set of measurements on the software module while performing a process to prepare the software module for execution on the data processing system. In response to the data processing system determining that the set of measurements meets a predetermined criterion, the data processing system requests an authorization to proceed with the process of preparing the software module for execution on the data processing system from a trusted third party computer. In response to the data processing system receiving the authorization to proceed with the process of preparing the software module for execution on the data processing system from the trusted third party computer, the data processing system executes the software module. According to other illustrative embodiments, a data processing system and computer program product for controlling execution of software are provided.

BRIEF DESCRIPTION OF THE DRAWINGS

FIGS. 4A-4B are a flowchart illustrating a process for controlling execution of software in accordance with an illustrative embodiment.

DETAILED DESCRIPTION

Figure 1:
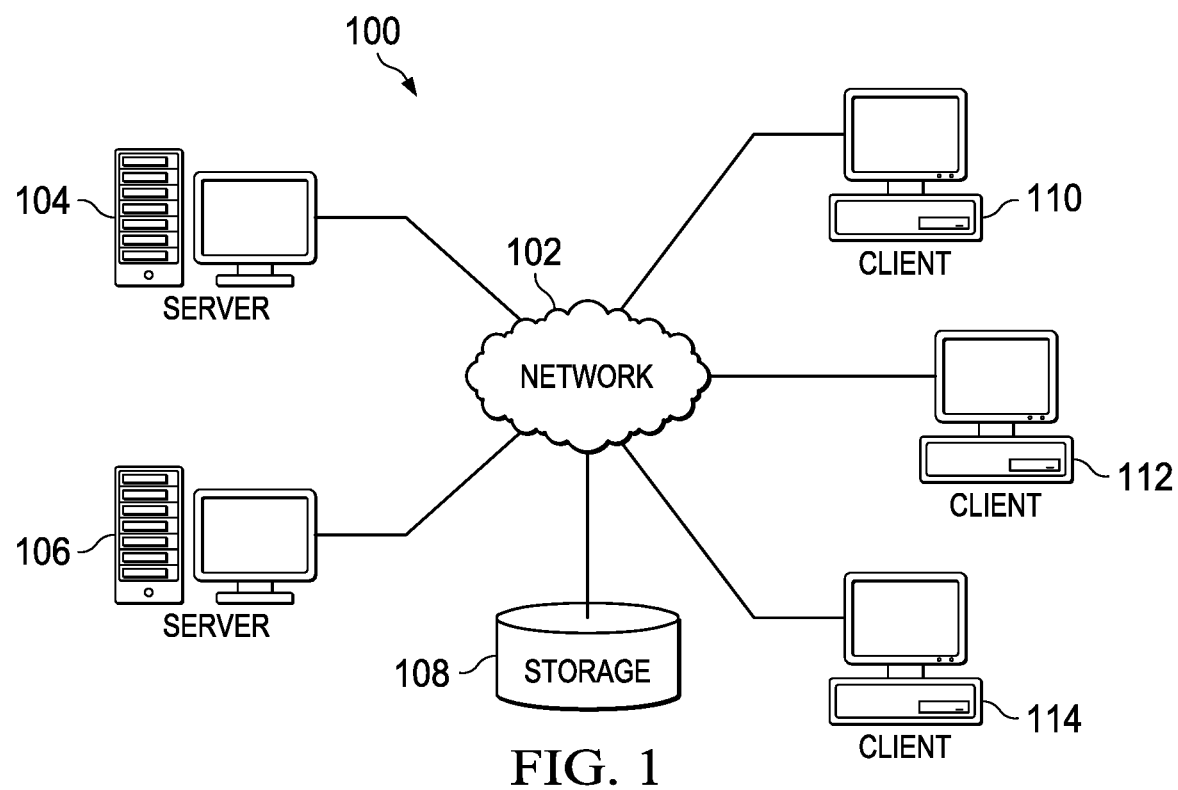
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
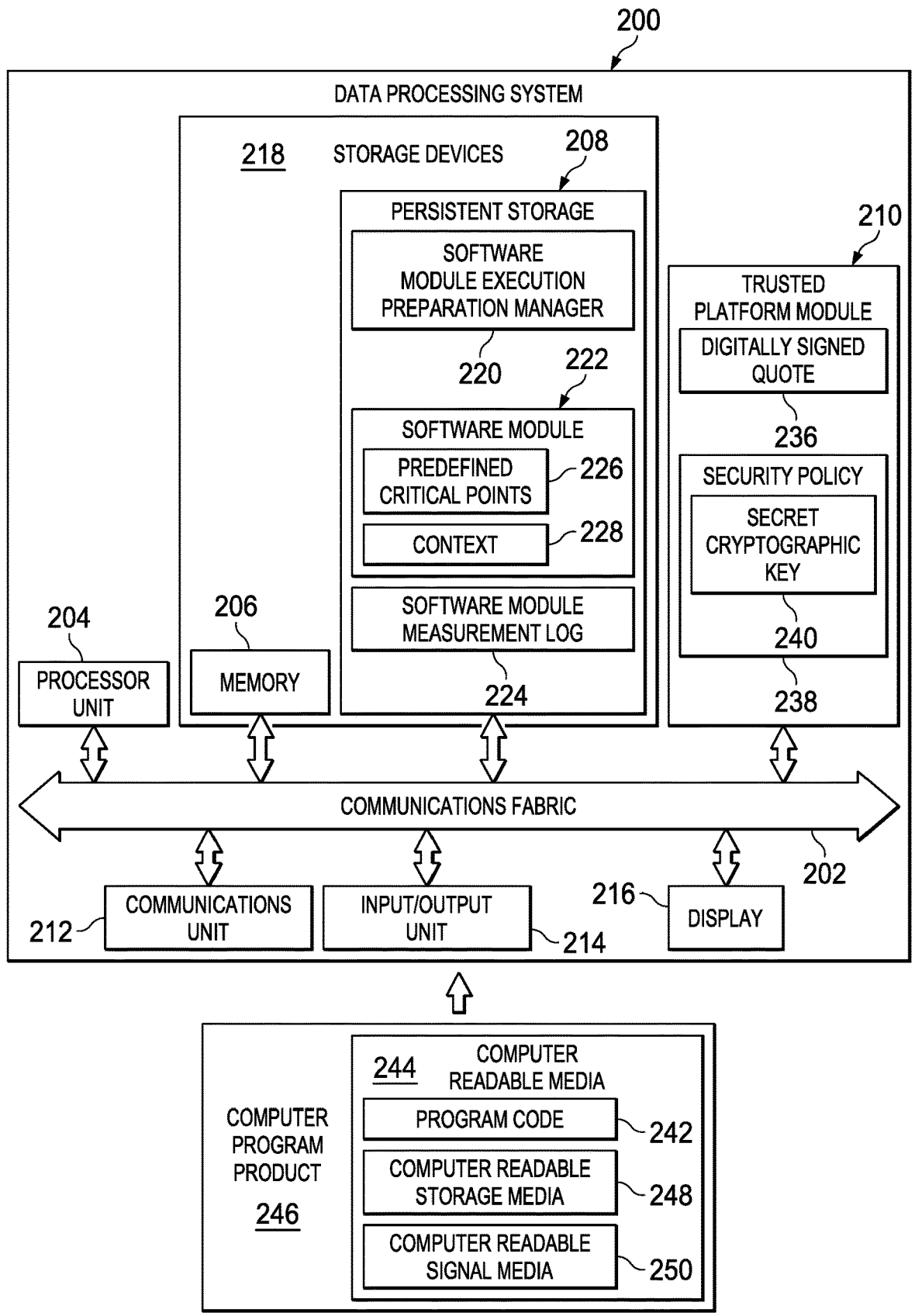
FIG. 2 is a diagram of a data processing system in which illustrative embodiments may be implemented.
Figure 3:
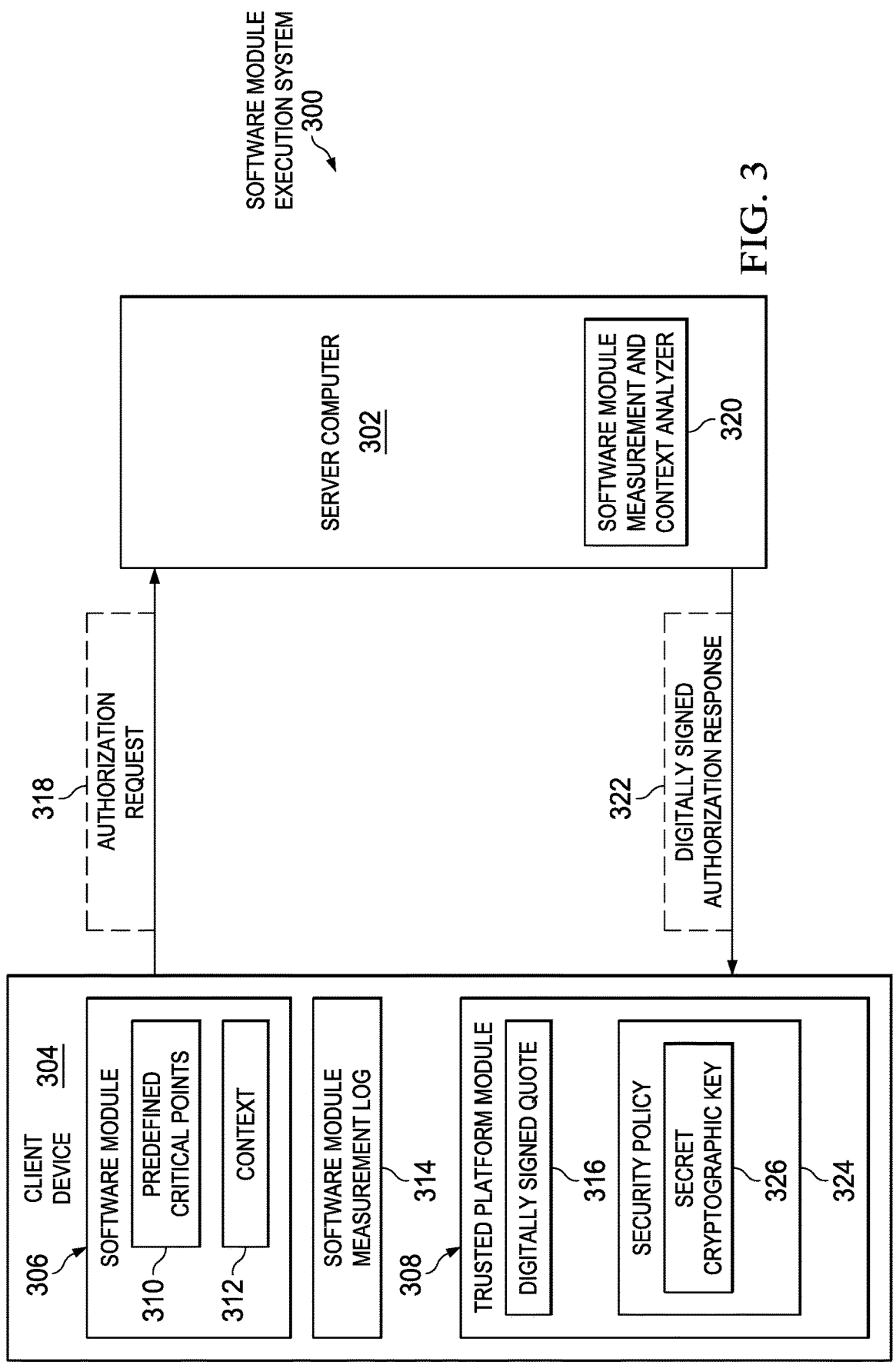
FIG. 3 is a diagram illustrating an example software module execution system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102 and may each represent a set of one or more server computers, a rack of server computers, a data center, or a cloud environment. In addition, server 104 and server 106 may provide, for example, a set of one or more services for controlling execution of software on client data processing system devices. For example, server 104 or server 106 may analyze measurements of a software module at predefined critical points while performing a process to prepare the software module for execution on a client data processing system device and analyze a context associated with preparing the software module for execution on the client data processing system device. In addition, server 104 or server 106 may direct the client data processing system device to either continue with the process of preparing the software module for execution or terminate the preparation process altogether based on the analysis of the software module measurements and context.

Client 110, client 112, and client 114 also connect to network 102. Clients 110, 112, and 114 are clients of server 104 or server 106. Server 104 and server 106 may provide information, such as boot files, operating system images, and software applications to clients 110, 112, and 114.

In this example, clients 110, 112, and 114 are shown as desktop computers that may include wire or wireless communication links to network 102. However, it should be noted that clients 110, 112, and 114 are intended as examples only. In other words, clients 110, 112, and 114 also may include other devices, such as, for example, network computers, laptop computers, handheld computers, smart phones, smart watches, personal digital assistants, gaming devices, kiosks, set-top boxes, or any combination thereof.

Storage 108 is a network storage device capable of storing any type of data in a structured format or an unstructured format. In addition, storage 108 may represent a set of one or more network storage devices. Storage 108 may store, for example, names and identification data corresponding to a plurality of different client device users and client devices, software module execution preparation managers, software modules, and the like. In addition, storage 108 may store authentication credential data, such as user names, passwords, and biometric data, corresponding to the plurality of client device users and system administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example and not as an architectural limitation for the different illustrative embodiments. For example, network data processing system 100 may be implemented in a cloud environment.

With reference now to FIG. 2, a diagram of a data processing system is depicted in accordance with an illustrative embodiment. Data processing system 200 is an example of a computer or other type of data processing system, such as client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, trusted platform module 210, communications unit 212, input/output (I/O) unit 214, and display 216.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores software module execution preparation manager 220. Software module execution preparation manager 220 controls a process for preparing software module 222 to execute in data processing system 200. Software module execution preparation manager 220 may be, for example, a basic input output system (BIOS) or any other type of system or process capable of preparing software module 222 for execution on data processing system 200. Software module 222 may be, for example, an operating system, a software application, a software program, a script, or the like. In addition, software module execution preparation manager 220 also performs a set of one or more measurements on software module 222 while preparing software module 222 for execution. It should be noted that software module execution preparation manager 220 does not perform all measurements of software module 222. In other words, data processing system 200 may utilize other components to perform additional measurements on software module 222. In addition, software module 222 may represent one of a plurality of different software modules loaded on data processing system 200. Also, it should be noted that even though software module execution preparation manager 220 is illustrated as residing in persistent storage 208, in an alternative illustrative embodiment software module execution preparation manager 220 may be a separate component of data processing system 200. For example, software module execution preparation manager 220 may be a hardware component coupled to communication fabric 202 or a combination of hardware and software components.

In addition to storing software module 222, persistent storage 208 also stores software module measurement log 224. However, it should be noted that alternative illustrative embodiments may store more or less data in persistent storage 208 than illustrated. In this example, software module 222 includes predefined critical points 226 and context 228. Predefined critical points 226 represent a set of one or more locations within software module 222 where specified action steps or events occur while the process of preparing software module 222 for execution is being performed prior to execution of software module 222. For example, a predefined critical point may be where software module 222 wants to connect to a network or access an encrypted storage during the execution preparation process. However, it should be noted that predefined critical points 226 may depend on the type of data processing system, software module, or security model utilizing illustrative embodiments.

Software module execution preparation manager 220 also records context 228. Context 228 is associated with the preparation of software module 222 for execution. Context 228 represents the circumstances surrounding or associated with preparing software module 222 for execution. For example, context 228 may include, for example, a time of day, a risk level corresponding to execution of software module 222, physical location of data processing system 200, an identity of a user operating data processing system 200, and the like.

Software module measurement log 224 represents a history of measurements and events associated with the preparation of software module 222 for execution. Software module execution preparation manager 220 stores the measurements performed by software module execution preparation manager 220 on software module 222 in software module measurement log 224.

Trusted platform module 210 is a specialized secure cryptographic processor chip that generates cryptographic keys for encrypting and decrypting data within trusted platform module 210. Trusted platform module 210 includes a set of platform configuration registers that allow secure storage of, for example, a hash, a digest, a summary, or a compression of software module measurement log 224. In addition, trusted platform module 210 may include a set of repair instructions regarding how to transition from a restricted execution of software module 222 to an unrestricted full execution of software module 222.

When software module execution preparation manager 220 reaches a predefined critical point in predefined critical points 226, software module execution preparation manager 220 directs trusted platform module 210 to utilize a cryptographic key to generate digitally signed quote 236 of the hash/digest/summary/compression of software module measurement log 224 stored in the set of platform configuration registers up to that predefined critical point. Then, software module execution preparation manager 220 sends software module measurement log 224 and digitally signed quote 236 to a trusted third party server for analysis via a network, such as network 102 in FIG. 1. However, it should be noted that alternative illustrative embodiments may utilize, for example, a point-to-point connection, peer-to-peer communication, a dedicated link, or dedicated hardware for communication between data processing system 200 and the trusted third party server. The trusted third party server may be, for example, server 104 in FIG. 1.

Subsequently, the trusted third party server sends an authorization response to data processing system 200. It should be noted that the trusted third party server may digitally sign the authorization response. The authorization response represents a message from the trusted third party server indicating that the trusted third party server has verified the integrity of software module 222 based on digitally signed quote 236 and software module measurement log 224 and context 228 prior to data processing system 200 executing software module 222. Software module execution preparation manager 220 analyzes the authorization response to determine whether authorization response includes unrestricted full execution authorization or restricted execution authorization. If the trusted third party server verified the integrity of software module 222, then the trusted third party server sends full execution authorization within the authorization response. Full execution authorization represents permission for data processing system 200 to proceed with the preparation of software module 222 for execution and to execute software module 222 without any restrictions. If the trusted third party server cannot verify the integrity of software module 222, then the trusted third party server sends a restricted execution authorization within the authorization response. Restricted execution authorization may represent permission for data processing system 200 to proceed with preparation of software module 222 for execution, but to execute software module 222 with a limited capability. Limited capability may mean, for example, that data processing system 200 allows software module 222 restricted or no access to resources, such as networks or encrypted drives. Also, it should be noted that the authorization response may include an instruction from the trusted third party server to terminate the process of preparing software module 222 for execution based on analyses of the software module measurement log 224 and context 228.

Further, trusted platform module 210 determines whether the authorization response satisfies security policy 238. If the authorization response does satisfy security policy 238, then trusted platform module 210 releases secret cryptographic key 240. Secret cryptographic key 240 represents a key that is required for data processing system 200 to proceed or continue with the process of preparing software module 222 for execution. Secret cryptographic key 240 may be, for example, a transport layer security key for connecting to a network or a decryption key for decrypting an encrypted drive.

Communications unit 212, in this example, provides for communication with other computers, data processing systems, and devices via a network, such as network 102 in FIG. 1. Communications unit 212 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 214 allows for the input and output of data with other devices that may be connected to data processing system 200. For example, input/output unit 214 may provide a connection for user input through a keypad, a keyboard, a mouse, and/or some other suitable input device. Display 216 provides a mechanism to display information to a user and may include touch screen capabilities to allow the user to make on-screen selections through user interfaces or input data, for example.

Instructions for the operating system, applications, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Two means of software control currently exist: 1) secure boot; and 2) trusted boot. Secure boot depends upon software being digitally signed by an authorizer. Typically, the authorizer is the supplier or distributor of the software. One drawback of secure boot is the requirement to digitally sign every software module before deployment. Secure boot also requires that the data processing system verify every software module digital signature. The result of the verification process is a go/no go decision by the data processing system. Another drawback of secure boot is that, once signed, it cannot be revoked, since verification is local. Thus, once back level software or software with a vulnerability is signed, for example, secure boot will not stop the software from running.

Trusted boot measures each software module during boot on a data processing system. A trusted platform module (TPM) of the data processing system records the measurements of each software module during boot. The trusted platform module may then report a state of the software module to a trusted third party server via a network. One drawback of trusted boot is that even though the trusted third party server may detect an undesired software module based on the measurements, it is detected after the fact. In other words, trusted boot does not prevent the undesired software module from running on the data processing system.

Illustrative embodiments combine features of secure boot and trusted boot, but operate differently to avoid the drawbacks of secure boot and trusted boot. For example, illustrative embodiments measure a software module while preparing the software module for execution as in the case of trusted boot. However, unlike trusted boot, illustrative embodiments will not allow a software module to execute on a data processing system until illustrative embodiments receive from a trusted third party server permission to proceed or continue with the process of preparing the software module for execution. In addition, unlike secure boot, illustrative embodiments do not require that software modules be individually signed by an authorizer. Further, the authorization from the trusted third party server may be more than a simple proceed/not proceed with preparing a software module for execution. For example, illustrative embodiments may take into consideration a context associated with preparing a software module for execution, such as, for example, time of day, risk level corresponding to execution of the software module, physical location of the data processing system, an identity of a user operating the data processing system platform, and the like. Illustrative embodiments may determine the risk level corresponding to execution of the software module by utilizing, for example, common vulnerabilities and exposures (CVE) identifiers, Common Vulnerability Scoring System (CVSS) scores, and/or Confidentiality, Integrity, and Availability (CIA) ratings. Furthermore, unlike trusted boot, illustrative embodiments prevent an unauthorized software module from executing on a data processing system rather than just reporting the presence of the unauthorized software module on the data processing system.

In one illustrative embodiment, the illustrative embodiment stores a set of one or more measurements of a software module while preparing the software module for execution in a measurement log. When a predefined critical point in a set of one or more predefined critical points is reached while preparing the software module for execution, the illustrative embodiment reports the measurements in the measurement log to a trusted third party server using a signed quote of the measurement log. The trusted third party server analyzes the measurement log and digitally signs an authorization response directing the data processing system to proceed with the process of preparing the software module for execution based on the measurement log analysis, which verified the integrity of the software module. If the trusted third party server cannot verify the integrity of the software module based on the measurement log analysis, then the trusted third party server will direct the data processing system platform to terminate or abort the process of preparing the software module for execution altogether.

It should be noted that alternative illustrative embodiments may utilize a plurality of different predefined critical points in a software module and send a digitally signed quote of the measurement log for analysis by the trusted third party server at each of these predefined critical points. Moreover, as noted above, the analysis by the trusted third party server may depend on various context or circumstances related to the data processing system.

In another alternative illustrative embodiment, the authorization response from the trusted third party server may direct the data processing system to boot the software module in a different way, such as, for example, in a limited capability mode with restrictions on access to networks, storage devices, or other peripherals. In yet another alternative illustrative embodiment, the data processing system may utilize a security policy of a trusted platform module. For example, the trusted platform module of the data processing system may determine whether the authorization response from the trusted third party server satisfies the security policy. If the authorization response satisfies the security policy, then the trusted platform module releases a secret cryptographic key, which is required for the data processing system to continue with the process of preparing the software module for execution. If the authorization response does not satisfy the security policy, then the trusted platform module does not release the secret cryptographic key and the boot of the software module stops. The secret cryptographic key may be, for example, a transport layer security key for network access or a decryption key for decrypting an encrypted storage disk.

With reference now to FIG. 3, a diagram of an example software module execution system is depicted in accordance with an illustrative embodiment. Software module execution system 300 may be implemented in, for example, a network of data processing systems, such as network data processing system 100 in FIG. 1. Software module execution system 300 is a collection of hardware and software components for controlling execution of a software module on a client data processing system device by combining features of secure boot and trusted boot.

In this example, software module execution system 300 includes server computer 302 and client device 304. Server computer 302 may be, for example, server 104 in FIG. 1, which is a trusted third party server. Client device 304 may be, for example, client 110 in FIG. 1 or data processing system 200 in FIG. 2. However, it should be noted that software module execution system 300 may include any number of server computers and client data processing system devices.

In this example, client device 304 includes software module 306 and trusted platform module 308, such as software module 222 and trusted platform module 210 in FIG. 2. In response to receiving an input to execute software module 306, client device 304 starts preparing software module 306 for execution. Software module 306 may be, for example, an operating system, application, program, or the like. In this example, software module 306 includes predefined critical points 310 and context 312, such as predefined critical points 226 and context 228 in FIG. 2.

While performing a process to prepare software module 306 for execution, client device 304 performs measurements on software module 306. Client device 304 may utilize, for example, a software module execution preparation manager, such as software module execution preparation manager 220 in FIG. 2, to perform one or more of the measurements on software module 306. Client device 304 stores the measurements of software module 306 in software module measurement log 314, such as software module measurement log 224 in FIG. 2. In addition, client device 304 records context 312, which is the circumstances, such as time of day and location of client device 304, associated with the process of preparing software module 306 for execution. Client device 304 also may store context 312, along with the software module measurements, within software module measurement log 314.

When client device 304 reaches a predefined critical point in predefined critical points 310, client device 304 directs trusted platform module 308 to generate digitally signed quote 316 of a hash/digest/summary/compression of software module measurement log 314 stored in a set of platform configuration registers of trusted platform module 308. Client device 304 sends software module measurement log 314 and digitally signed quote 316 to server computer 302 within authorization request 318.

Server computer 302 utilizes software module measurement and context analyzer 320 to analyze the information contained in authorization request 318 to verify the integrity of software module 306 prior to execution of software module 306 by client device 304. After analyzing the information contained in authorization request 318, server computer 302 sends digitally signed authorization response 322 to client computer 304. Client device 304 analyzes digitally signed authorization response 322 using trusted platform module 308, for example. Trusted platform module 308 determines whether digitally signed authorization response 322 satisfies security policy 324, such as security policy 238 in FIG. 2. If trusted platform module 308 determines that digitally signed authorization response 322 satisfies security policy 324, then trusted platform module 308 releases secret cryptographic key 326, such as secret cryptographic key 240 in FIG. 2, which is required for client device 304 to continue with the process of preparing software module 306 for execution. Thus, server computer 302 provides authorization or permission for client device 302 to continue with preparing software module 306 for execution.

Figure 4B:
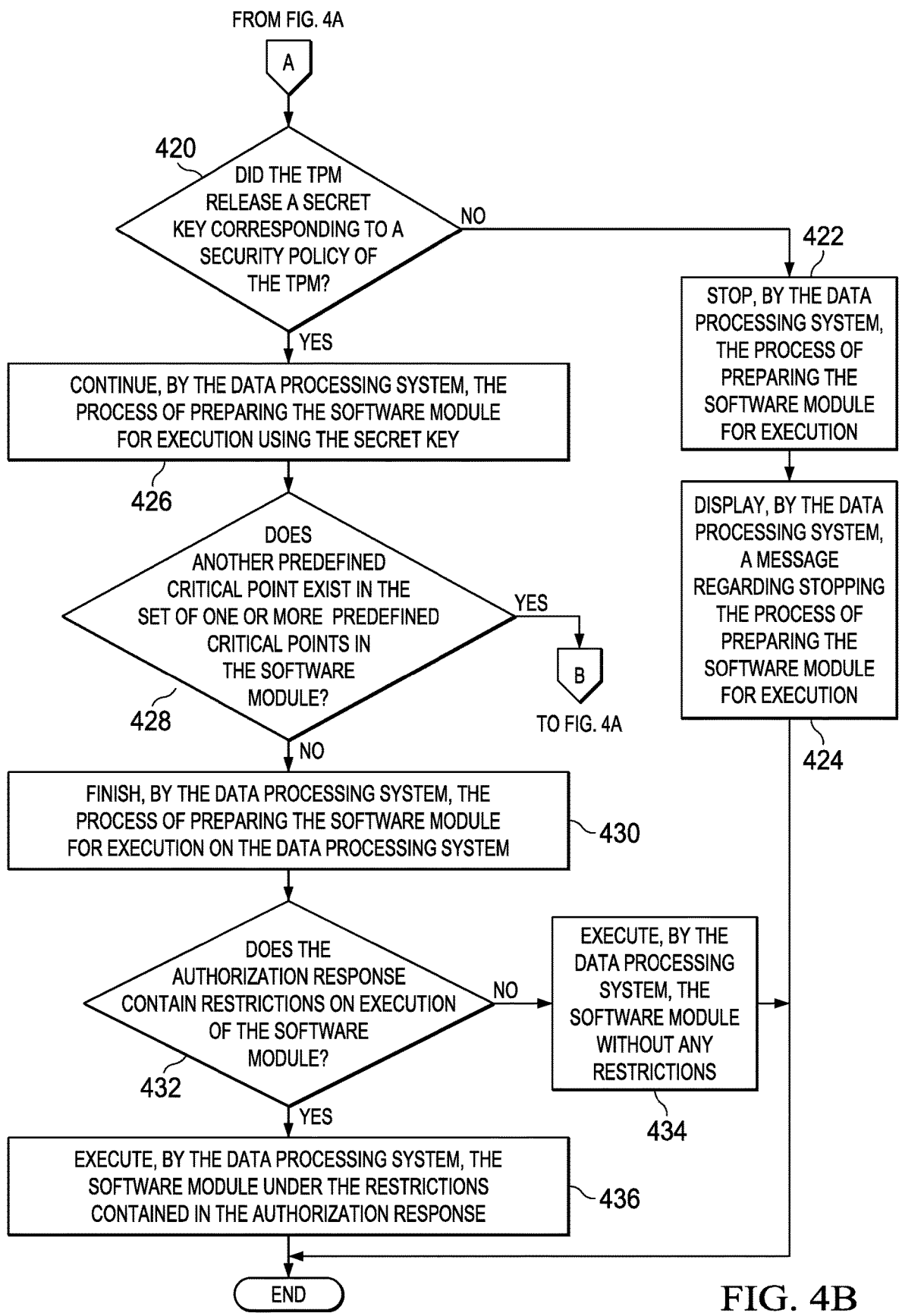

With reference now to FIGS. 4A-4B, a flowchart illustrating a process for controlling execution of software is shown in accordance with an illustrative embodiment. The process shown in FIGS. 4A-4B may be implemented in a data processing system, such as, for example, data processing system 200 in FIG. 2 and client device 304 in FIG. 3.

The process begins when the data processing system receives an input to execute a software module of the data processing system (step 402). The software module may be, for example, software module 306 in FIG. 3 and may be an operating system or a software application. After receiving the input to execute the software module in step 402, the data processing system starts a process of preparing the software module for execution on the data processing system (step 404). The process of preparing the software module for execution may be, for example, starting an initial boot of an operating system at startup of the data processing system or may be starting an application on the data processing system after the data processing system is operational.

Subsequent, to starting the process of preparing the software module for execution in step 404, the data processing system performs a set of one or more measurements on the software module while preparing the software module for execution (step 406). In addition, the data processing system records the set of one or more measurements on the software module in a measurement log (step 408). The measurement log may be, for example, software module measurement log 314 of FIG. 3.

Further, the data processing system records a context associated with preparing the software module for execution (step 410). The context may be, for example, context 312 in FIG. 3. Moreover, the data processing system reaches a predefined critical point in a set of one or more defined critical points while preparing the software module for execution (step 412). The predefined critical point may be, for example, a predefined critical point in predefined critical points 310 in FIG. 3.

After reaching the predefined critical point in step 412, the data processing system sends an authorization request to proceed with the process of preparing the software module for execution to a trusted third party server (step 414). The authorization request may be, for example, authorization request 318 in FIG. 3. The authorization request may include, for example, the measurement log corresponding to the software module, a digitally signed quote of the measurement log, and the context associated with preparing the software module for execution. The trusted third party server may be, for example, server computer 302 in FIG. 3.

Subsequently, the data processing system receives an authorization response from the trusted third party server (step 416). The authorization response may be, for example, digitally signed authorization response 322 in FIG. 3. The authorization response may include, for example, a full execution of the software module authorization or a restricted execution of the software module authorization. In addition, the authorization response may include other information, such as an explanation for the restricted execution authorization or an explanation for terminating the process of preparing the software module for execution. The explanation may indicate that the trusted third party server could not verify the integrity of the software module.

After receiving the authorization response from the trusted third party server in step 416, the data processing system applies the authorization response to a trusted platform module of the data processing system (step 418). The trusted platform module may be, for example, trusted platform module 308 in FIG. 3. Subsequent to applying the authorization response to the trusted platform module in step 418, the data processing system makes a determination as to whether the trusted platform module released a secret key corresponding to a security policy of the trusted platform module (step 420). The secret key corresponding to the security policy may be, for example, secret cryptographic key 326 corresponding to security policy 324 in FIG. 3.

If the data processing system determines that the trusted platform module did not release the secret key, no output of step 420, then the data processing system stops the process of preparing the software module for execution (step 422). In addition, the data processing system displays a message regarding stopping the process of preparing the software module for execution (step 424). The data processing system may display the message in a display device of the data processing system, such as, display 216 in FIG. 2. Thereafter, the process terminates.

Returning again to step 420, if the data processing system determines that the trusted platform module did release the secret key, yes output of step 420, then the data processing system continues the process of preparing the software module for execution using the secret key (step 426).

Further, the data processing system makes a determination as to whether another predefined critical point exists in the set of one or more predefined critical points in the software module (step 428). If the data processing system determines that another predefined critical point does exist in the set of one or more predefined critical points, yes output of step 428, then the process returns to step 412 where the data processing system goes on to reach the next predefined critical point in the set of predefined critical points in the software module. If the data processing system determines that another predefined critical point does not exist in the set of one or more predefined critical points in the software module, no output of step 428, then the data processing system finishes the process of preparing the software module for execution on the data processing system (step 430).

The data processing system also makes a determination as to whether the authorization response contains restrictions on execution of the software module (step 432). If the data processing determines that the authorization response does not contain restrictions on execution of the software module, no output of step 432, then the data processing system executes the software module without any restrictions (step 434) and the process terminates thereafter. If the data processing determines that the authorization response does contain restrictions on execution of the software module, yes output of step 432, then the data processing system executes the software module under the restrictions contained in the authorization response (step 436) and the process terminates thereafter.

Figure 5:
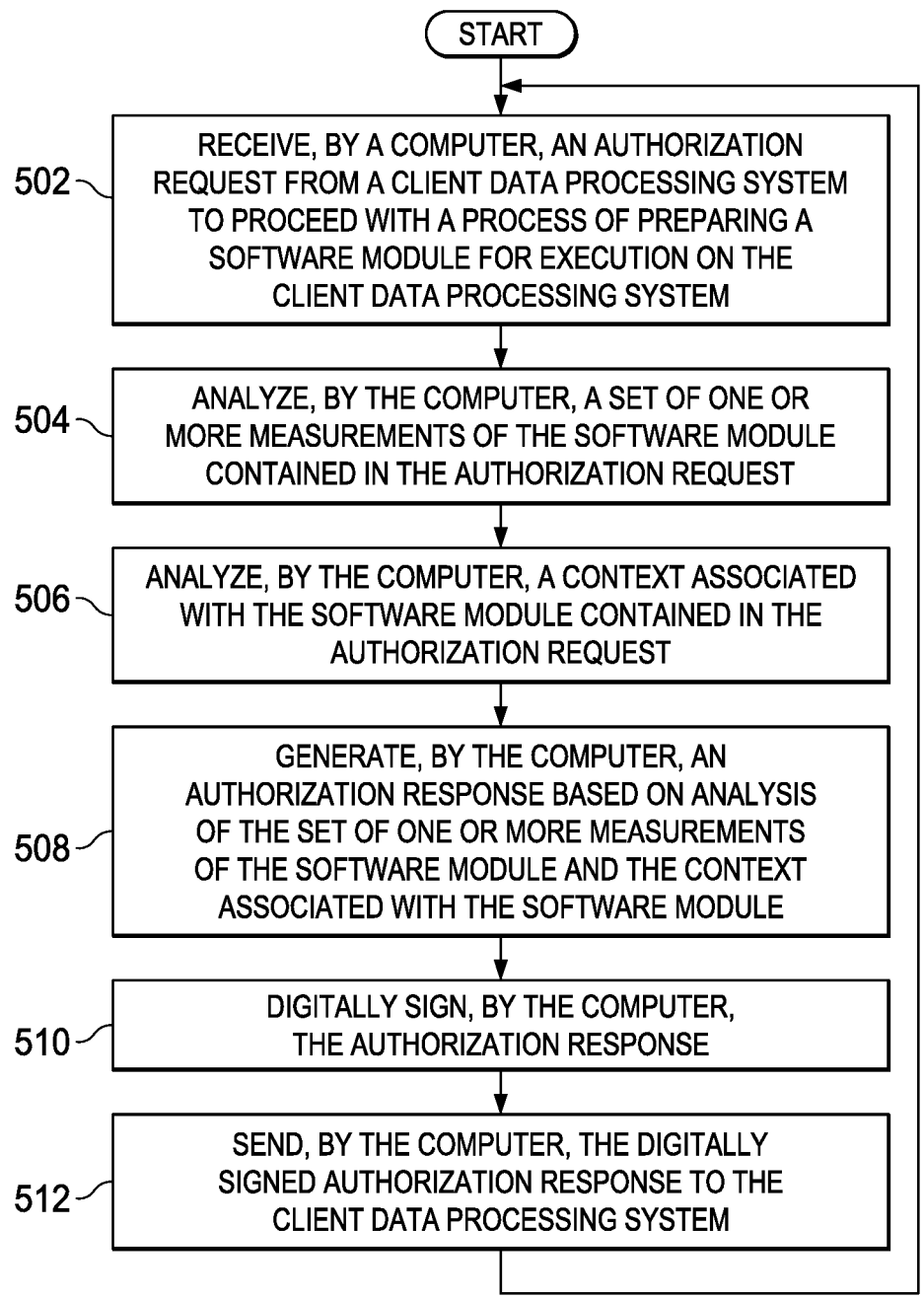
FIG. 5 is a flowchart illustrating a process for generating an authorization response in accordance with an illustrative embodiment.

With reference now to FIG. 5, a flowchart illustrating a process for generating an authorization response is shown in accordance with an illustrative embodiment. The process shown in FIG. 5 may be implemented in a server computer, such as, for example, server 104 in FIG. 1 or server computer 302 in FIG. 3.

The process begins when the computer receives an authorization request from a client data processing system to proceed with a process of preparing a software module for execution on the client data processing system (step 502). The authorization request from the client data processing system may be, for example, authorization request 318 from client device 304 in FIG. 3. The software module may be, for example, software module 306 in FIG. 3.

After receiving the authorization request from the client data processing system in step 502, the computer analyzes a set of one or more measurements of the software module contained in the authorization request (step 504). In addition, the computer analyzes a context associated with the software module contained in the authorization request (step 506). Subsequently, the computer generates an authorization response based on analysis of the set of one or more measurements of the software module and the context associated with the software module (step 508).

Further, the computer digitally signs the authorization response (step 510). Furthermore, the computer sends the digitally signed authorization response to the client data processing system (step 512). The digitally signed authorization response may be, for example, digitally signed authorization response 322 in FIG. 3. Thereafter, the process returns to step 502 where the computer waits to receive another authorization request from a client.

Thus, illustrative embodiments of the present invention provide a computer-implemented method, data processing system, and computer program product for controlling execution of a software module on a client data processing system platform by a trusted third party server combining features of secure boot and trusted boot. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for controlling execution of software, the computer-implemented method comprising:
responsive to a data processing system receiving an input to execute a software module on the data processing system, performing, by the data processing system, a set of measurements on the software module while performing a process to prepare the software module for execution on the data processing system;
responsive to the data processing system determining that the set of measurements meets a predetermined critical point in a set of critical points, requesting, by the data processing system, an authorization to proceed with the process of preparing the software module for execution on the data processing system from a trusted third party computer, wherein each critical point in the set of critical points represents a location within the software module where a specified action or event occurs when preparing the software module for execution prior to the execution of the software module; and
responsive to the data processing system receiving the authorization to proceed with the process of preparing the software module for execution on the data processing system from the trusted third party computer, executing, by the data processing system, the software module.

2. The computer-implemented method of claim 1 further comprising:
sending, by the data processing system, a request for the authorization to the trusted third party computer, wherein the request for the authorization includes a digitally signed version of a measurement log associated with the software module.

3. The computer-implemented method of claim 1, wherein the predetermined critical point is where the software module wants to connect to a network when preparing the software module for execution.

4. The computer-implemented method of claim 1 further comprising:
responsive to the data processing system receiving the authorization to proceed with the process of preparing the software module for execution on the data processing system from the trusted third party computer, determining, by the data processing system, whether the authorization satisfies a security policy.

5. The computer-implemented method of claim 4 further comprising:
responsive to the data processing determining that the authorization satisfies the security policy, releasing, by the data processing system, a secret key.

6. The computer-implemented method of claim 5, wherein the secret key is released from a trusted platform module of the data processing system.

7. The computer-implemented method of claim 5, wherein the secret key is required by the data processing system to continue with the process of preparing the software module for execution on the data processing system.

8. The computer-implemented method of claim 1, wherein the data processing system sends the set of measurements to the trusted third party computer in response to a set of criteria being met, and wherein each different criteria of the set of criteria corresponds to a different defined point in a set of defined points in the software module.

9. The computer-implemented method of claim 1, wherein the data processing system performs the set of measurements on the software module during a trusted boot process of the software module on startup of the data processing system, and wherein the software module is an operating system of the data processing system.

10. The computer-implemented method of claim 1, wherein the process of preparing the software module for execution is starting the software module on the data processing system after the data processing system is operational, and wherein the software module is one application in a plurality of different applications installed on the data processing system.

11. A data processing system for controlling execution of software, the data processing system comprising:
a bus system;
a storage device connected to the bus system, wherein the storage device stores program instructions; and
a processor connected to the bus system, wherein the processor executes the program instructions to:
perform a set of measurements on a software module while performing a process to prepare the software module for execution on the data processing system in response to the data processing system receiving an input to execute the software module on the data processing system;
request an authorization to proceed with the process of preparing the software module for execution on the data processing system from a trusted third party computer in response to determining that the set of measurements meets a predetermined critical point in a set of critical points, wherein each critical point in the set of critical points represents a location within the software module where a specified action or event occurs when preparing the software module for execution prior to the execution of the software module; and
execute the software module in response to the data processing system receiving the authorization to proceed with the process of preparing the software module for execution on the data processing system from the trusted third party computer.

12. The data processing system of claim 11, wherein the processor further executes the program instructions to:
send a request for the authorization to the trusted third party computer, wherein the request for the authorization includes a digitally signed version of a measurement log associated with the software module.

13. The data processing system of claim 11, wherein the predetermined critical point is where the software module wants to connect to a network when preparing the software module for execution.

14. A computer program product for controlling execution of software, the computer program product comprising a computer readable storage medium having program instructions embodied therewith, the program instructions executable by a data processing system to cause the data processing system to perform a method comprising:
  responsive to the data processing system receiving an input to execute a software module on the data processing system, performing, by the data processing system, a set of measurements on the software module while performing a process to prepare the software module for execution on the data processing system;
  responsive to the data processing system determining that the set of measurements meets a predetermined critical point in a set of critical points, requesting, by the data processing system, an authorization to proceed with the process of preparing the software module for execution on the data processing system from a trusted third party computer, wherein each critical point in the set of critical points represents a location within the software module where a specified action or event occurs when preparing the software module for execution prior to the execution of the software module; and
  responsive to the data processing system receiving the authorization to proceed with the process of preparing the software module for execution on the data processing system from the trusted third party computer, executing, by the data processing system, the software module.

15. The computer program product of claim 14 further comprising:
  sending, by the data processing system, a request for the authorization to the trusted third party computer, wherein the request for the authorization includes a digitally signed version of a measurement log associated with the software module.

16. The computer program product of claim 14, wherein the predetermined critical point is where the software module wants to connect to a network when preparing the software module for execution.

17. The computer program product of claim 14 further comprising:
  responsive to the data processing system receiving the authorization to proceed with the process of preparing the software module for execution on the data processing system from the trusted third party computer, determining, by the data processing system, whether the authorization satisfies a security policy.

18. The computer program product of claim 17 further comprising:
  responsive to the data processing determining that the authorization satisfies the security policy, releasing, by the data processing system, a secret key.

19. The computer program product of claim 18, wherein the secret key is released from a trusted platform module of the data processing system.

20. The computer program product of claim 18, wherein the secret key is required by the data processing system to continue with the process of preparing the software module for execution.

* * * * *